United States Patent [19]
Nishino

[11] Patent Number: 5,161,856
[45] Date of Patent: Nov. 10, 1992

[54] RECLINING DEVICE FOR A SEAT

[75] Inventor: Takaichi Nishino, Akishima, Japan

[73] Assignee: Tachi-S Co., Ltd., Tokyo, Japan

[21] Appl. No.: 491,238

[22] Filed: Mar. 9, 1990

[51] Int. Cl.⁵ .............................................. B60N 2/22
[52] U.S. Cl. ................................. 297/367; 297/363; 297/379
[58] Field of Search .................. 297/367, 379, 363–366

[56] References Cited

U.S. PATENT DOCUMENTS 4,348,050  9/1982  Letournoux .................. 297/367 X
4,770,464  9/1988  Pipon et al. .................. 297/367

FOREIGN PATENT DOCUMENTS 2578608  9/1986  France ..................... 297/367
893419   4/1962  United Kingdom ........... 297/367
2117440  10/1983 United Kingdom ........... 297/367

Primary Examiner—Peter R. Brown
Attorney, Agent, or Firm—Oldham & Oldham Co.

[57] ABSTRACT

A reclining device for a seat, comprising a stationary base plate and rotatable plate, both being fitted together, with the rotatable plate free to rotate relative to the base plate. An annular toothed portion and an unlock area are respectively formed in either of those two plates, and a lock gear is interposed between the plates in a vertically slidable manner such that, with the rotation of the rotatable plate, the lock gear is disengaged from the toothed portion and rides on the unlock area, or vice versa, to thereby place the reclining device in a locked or unlocked state, by simply operating a lever to effect such engagement/disengagement of the lock gear to the toothed portion.

10 Claims, 4 Drawing Sheets

RECLINING DEVICE FOR A SEAT

BACKGROUND OF THE INVENTION

1. Field of the Invention

The present invention relates to a reclining device for a seat, and in particular, relates to a reclining device used in a front seat, of the type which is especially adapted for use in the two-door or three-door vehicle and designed to be inclinable forwardly, permitting entry of a rear-seat occupant into a rear seat therein.

2. Description of Prior Art

In the type of such coupe two-door vehicle or hatchback three-door one, normally, the front seat is inclined forwardly so as to permit entry of a rear-seat occupant into the rear seat with ease. Thus, the best design thereof is such that the seat back of the front seat can be quickly inclined forwardly in for the rear-seat occupant to climb into the rear seat smoothly. Conventionally, for that purpose, there has been known such biasing mechanism based on a spiral spring which biases the seat back to incline forwardly, and such separate mechanism has been required and used on the reclining drive part of the seat, independently of lock means associated therewith. In brief, this conventional biasing mechanism is actuated in cooperation of the lock means by means of an operation lever of the reclining device. When the operation lever is moved so as to release the locked state of the lock means, then simultaneously the seat back is caused by the biasing force of the spiral spring to quickly rotate forwardly about the pivot point of the reclining device with respect to the cushion seat.

However, the abovementioned biasing mechanism of a separate type has encountered various drawbacks, in that (i) the separate unit of the mechanism per se requires preparation of a number of other special fittings for securing itself to the reclining device which results in an undesired increase in size of the reclining part of the seat on the whole, (ii) the biasing force of the spiral spring needs to be increased enough so as to effect a rapid forward inclination of the seat back, which means that the seat back is normally, strongly biased in the forward direction of the seat, as a result of which, when a front-seat occupant unlocks the lock means to adjust a reclining angle of the seat back, he or she will be hit by the seat back and damage could be caused to the person because of the great force, thus making the front-seat occupant uneasy with the seat, while in addition, he or she must use much force to return the seat back to the normal standing position, overcoming the biasing force of the spring, and (iii) because the lock means is given a play allowing for the forwardly biased seat back to facilitate the ease of disengagement among the associated lock elements, as with the normal lock structure, the seat back, when leaned by the occupant, is inclined backwardly an amount equal to that play, which also gives an uneasy psychological state to the occupant.

SUMMARY OF THE INVENTION

In view of the above-stated drawbacks, it is a first purpose of the present invention to provide an improved reclining device which permits quick forward inclination of a seat back without use of a separate mechanism.

In achievement of such purpose, the present invention comprises a stationary base plate fixed on one of a seat back frame and seat cushion frame, a rotatable plate secured rotatably on the other of the seat back and cushion frames, at least one lock gear slidably secured in said stationary base plate, an inwardly toothed portion formed in said rotatable plate, an unlock portion defined part-way in the inwardly toothed portion, a cam supported rotatably between said base and rotatable plates, the cam being so arranged that it is normally biased to press the lock gear towards and into mesh engagement with the inwardly toothed portion. Accordingly, when the cam is actuated to release such mesh engagement, the rotatable plate is rotated, with the lock gear riding on the unlock portion, whereby the seat back is inclined forwardly by a biasing means inherent in the reclining device, and also, the seat back can easily be returned to a first locked position by pushing same backwardly, in which case, the lock gear descends from the unlock portion and is biased into mesh engagement with the inwardly toothed portion.

In one aspect of the invention, thus, the above elements are small in number, providing a far simplified structure and reducing the number of fittings, and also, allowing the device per se to be secured easily to the seat frame by use of bolt and nut.

DETAILED DESCRIPTION OF PREFERRED EMBODIMENT OF THE INVENTION

Figure 1:
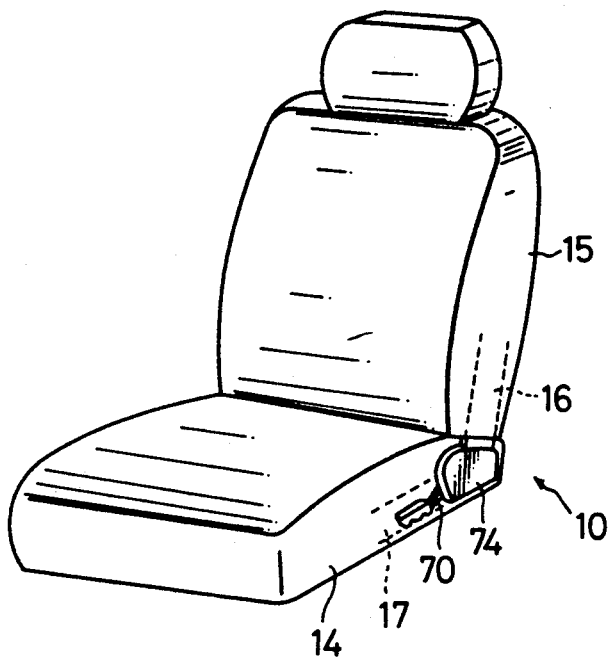
FIG. 1 is a perspective view of a seat to which is attached a reclining device in accordance with the present invention.

Referring to FIGS. 1 though 3, there is illustrated a reclining device (10) in accordance with the present invention, which is attached to a seat (A).

Figure 2:
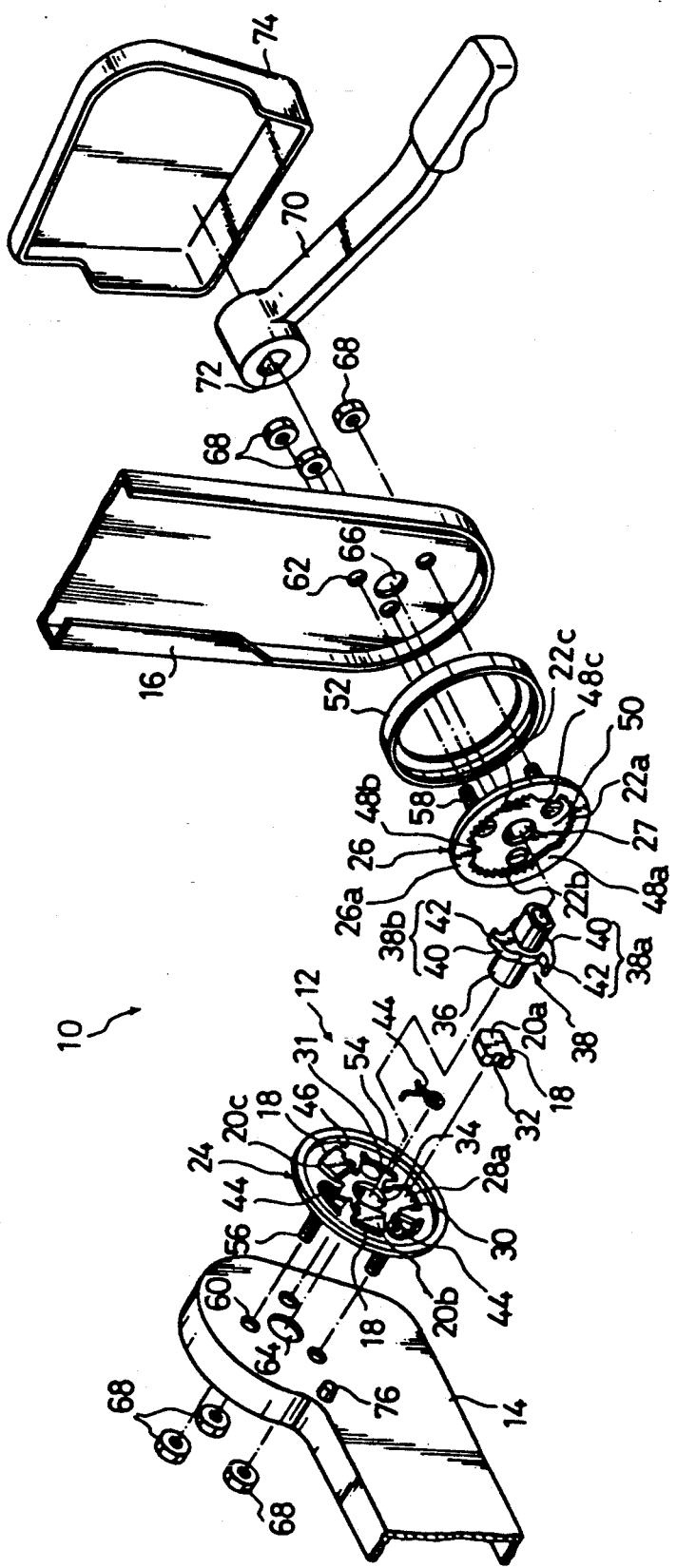
FIG. 2 is an exploded perspective view of the reclining device.

As shown in FIG. 2, the reclining device (10) is provided with a locking mechanism (12)., Looking at FIG. 1, the seat (A) is basically composed of a seat back (15) and seat cushion (14), such that the seat back and cushion (15)(14), respectively, has, provided therein, a seat back frame (16) and seat cushion frame (17), with such arrangement that the lower ends of the seat back frame (16) are rotatably connected via the locking mechanism (12) with the rear ends of the seat cushion frame (17).

Figure 4:
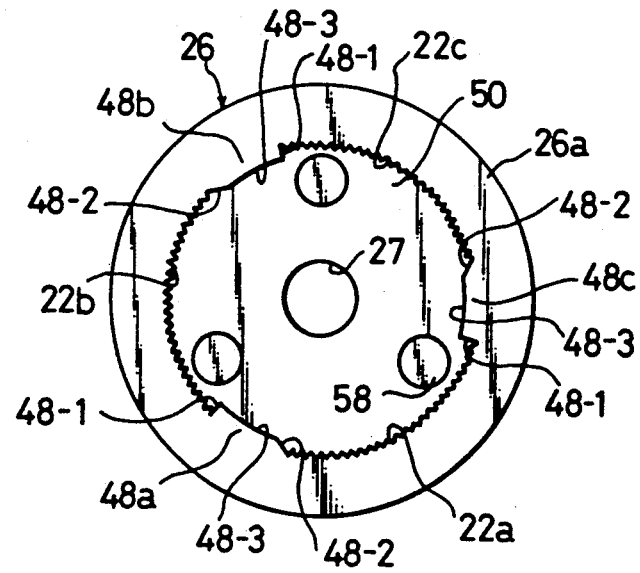
FIG. 4 is a perspective view of a rotatable plate in the reclining device.

Referring to FIGS. 2 and 4, there is best shown the locking mechanism (12), which consists essentially of a stationary base plate (24) fixed on the rear end part of one lateral bar frame of the seat cushion frame (14), a rotatable frame (25) fixed on the lower end part of one lateral bar frame of the seat back frame (16), three lock gears consisting of a lower lock gear (28a), a first upper lock gear (28b) and a second upper lock gear (28c), which are arranged between the base and rotatable frame (25), as will be discussed later, a cam (38) which is rotatably journalled via a shaft (36) between the two plates (24)(26), a support ring (52) adapted for supportively containing the two plates (24)(26) therein in a manner embracing them together, allowing free rotation of the rotatable plate (26) relative to the stationary one (24).

In the illustrated embodiment, the stationary base plate (24) is formed in a disc shape, with a circular rim (46) circumscribing the periphery thereof, and in its inner surface (24a), there are formed three elongated guide grooves; namely, a lower guide groove (28a), a first upper guide groove (28b) and a second upper guide groove (28c), such that they extend radially outwardly in relation to the center axis of a hole (34), away from one another at the angle of 120 degrees. Each of the guide grooves (28a)(28b)(28c) is formed at its lateral side with a protrusion (30). Further, in the same inner surface (24a) of the plate (24), a first securing groove (31a), a second securing groove (31b), and a third securing groove (31c) are formed at an interval of approx. 120 degrees that adjoins the respective three guide grooves (28a)(28b)(28c) as shown.

The guide grooves (28a)(28b)(28c) are so adapted that the three lock gears (20a)(28b)(28c ) are respectively received therein in a slidable manner so that those gears are slidable vertically along the longitudinal direction of the corresponding grooves.

The securing grooves (31a)(31b)(31c) are formed in a proper shape to secure the three torsion springs (44) therein, respectively, such that one free end each of the springs (44) projects at the opening side of the respective grooves (31a)(31b)(31c).

Designations (29a-1)(29a-2) denote a pair of spaced-apart first cam rotation limit areas, (29b-1)(29b-2) denote a pair of spaced-apart second cam rotation limit areas, and (29c-1)(29c-2) denote a pair of spaced-apart third cam rotation limit areas. As shown, those first, second and third limit areas (29a-1)(29a-2)(29b-1)(29b-2)(29c-1)(29c-2) are respectively formed such as to extend inwardly towards the central axis of the base plate (24) on the opposite sides of and symmetrically relative to each of the first, second and third spring securing grooves (31a)(31b)(31c). It is noted here that those cam rotation limit areas (29a-1)(29a-2)(29b-1)(29b-2)(29c-1)(29c-2) are defined as a result of forming the above-stated guide grooves (28a)(28b)(28c) and securing grooves (31a)(31b)(31c) in the inner surface (24a) at their respective boundaries, thus extending continuously flush with the inner surface (24a) which is to be slidably contacted with that (26a) of the rotatable plate (26), but serve to limit the clockwise and counterclockwise rotation of the cam (38) as will be explained later.

The above-constructed base plate (24) is fixed to the end part of the seat cushion frame (14) by means of three bolts and nuts (56)(58) being respectively secured together at three holes (60) formed on that particular end part of the seat cushion frame (14), with the hole (34) being coaxially aligned with a hole (64) formed in the same end part of the seat cushion frame (14).

Figure 3:
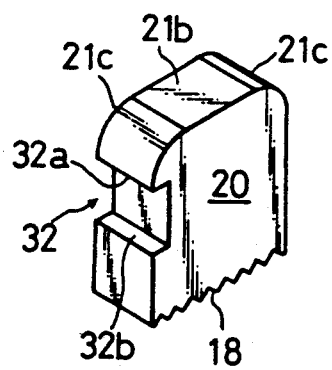
FIG. 3 is perspective view of a lock gear in the reclining device.

FIG. 3 depicts a most preferred form of the lock gears (20a)(20b)(20c), although they may be formed in other suitable shape insofar as they serve the purpose to be stated later.

As shown, the lock gears (20a)(20b)(20c) are each formed in a generally rectangular shape so dimensioned as to be slidable along the corresponding guide grooves (28a)(28b)(28c), having both lateral rectilinear walls (21a) whose width is small relative to that of the guide grooves, with a cut-away area (32) defined at one of both lateral walls (20a), within which cut-away area (32), is to be disposed the protrusion (30) respectively of the guide grooves (28a)(28b)(28c), a cambered toothed portion (18) formed on its side facing outwardly from the center axis of the base plate (24), a pair of opposingly spaced-apart arcuate shoulder portions (20c)(20c) formed at the side opposed to that one having the toothed portion (28), and a flat locking surface (21c) defined between the two shoulder portions (20c)(20c).

They cut-away area (32) has a first limit surface (32a) and a second limit surface (32b), which provides a limit against the vertical movements each of the lock gears (28a)(28b)(28c).

As can be seen from FIG. 4, the three lock gears (20a)(20b)(20c) are arranged in the base plate (23) such as to be respectively received in the guide grooves .(28a)(28b)(28c ), wherein the respective protrusions (30) of the grooves are disposed in each of the cut-away areas (32) of the lock gears. Accordingly, as in FIGS. 7 and 8, it is seen that the lock gears (20a)(20b)(20c) are free to slide along the longitudinal direction of the guide grooves (28a)(28b)(28c), respectively, but are limited to their inward sliding movements towards the center of the base plate (24) due to the first limit surface (32a) each of the three lock gears coming to bear against the protrusions (30), and also limited to their outward movements away from that base plate center due to the opposed second limit surface (32b) coming to bear against the protrusions (30).

It is noted that the lock gears (20a)(20b)(20c) are partially received in the respective guide grooves (28a)(28b)(28c) so as to expose their toothed portions (18) above the inner surface (24a ) of the base plate (25) for meshed engagement purpose to be stated below.

The rotatable plate (26) is formed in a disc shape having an outer diameter substantially equal to the inner diameter of the rim (46) of the stationary base plate (26). The rotatable plate (26) is at its center formed with a hole (27), and is fixedly secured to the lower end part of the seat back frame (16) by means of three bolts and nuts being engaged together via the respective three holes (62) with the hole (27) of the rotatable plate (26) being coaxially aligned with the hole (66) of the seat back frame (16).

As best shown in FIG. 4, the rotatable plate (26) has an internal slidable flat surface (26a) and a circular recess (50) formed in that surface (26a). The circular recess (50) is formed, along its internal circumference, with three inwardly toothed portions (22a)(22b)(22c) and three unlock portions (48a)(48b)(48c), the arrangement of those portions being such that they are defined alternately along the internal circumference of the circular recess (50) in a way locating the former and latter, respectively, in a 120-degree spaced-apart relationship with respect to the center of the rotatable plate (26). The unlock portions (48a)(48b)(48c) project more inwardly a small distance than the toothed portions (22a)(22b)(22c) and extend continuously from the inner surface (26a) on the same plane therewith, comprising a vertical stopper surface (48-1), a sloped surface (48-2) and a lock surface (48-3) intermediate the two surfaces (48-1)(48-2). In the shown embodiment, as viewed from FIG. 4, every vertical surface (48-1) of the unlock portions (48a)(48b)(48c) is oriented in a clockwise direction, whereas every sloped surface (48-2) thereof is oriented in a counterclockwise direction, with respect to the relatable plate (26).

In this context, to facilitate the understanding of relative locations and interrelation among the three toothed portions (22a)(22b)(22c) and unlock portions (48a)(48b)(48c), the former shall be referred to as a first toothed portion (22a), a second toothed portion (22b) and a third toothed portion (23c), respectively, whereas the latter be referred to as a first unlock portion (48a), a second unlock portion (48b) and a third unlock portion (48c), respectively, hereinafter.

The cam (38) is fixed on the non-circular shaped shaft (36), and comprises three can members (38a)(38b)(38c) which project radially from the center axis of the shaft (36) in a 120-degree spaced-apart relation with one another. Each of the three cam members (38a)(38b)(38c) are formed at its free end with a spring securing edge (42) to be engaged with each of the free end of the springs (44), and further formed, at its base area adjacent the securing edge (42), with a semi-circular pressure edge (40) adapted to impart a pressing force to each of the lock gears (20). One free end of the shaft (36) passes rotatably through the holes (27)(66) and is fixed in the securing hole (72) of the operation (70), so that both shaft and cam (36)(38) may be rotated between the stationary and rotatable plates (24)(26) by rotating vertically the lever (70). As can be seen from FIG. 2, the other free end of the shaft (36) is rotatably supported by the foregoing two holes (34)(64).

Figure 5:
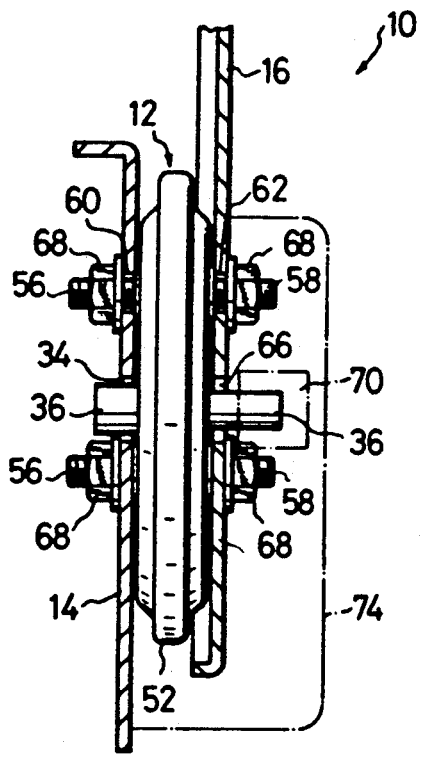
FIG. 5 is a front view of the reclining device provided between a seat cushion frame and seat back frame.
Figure 6:
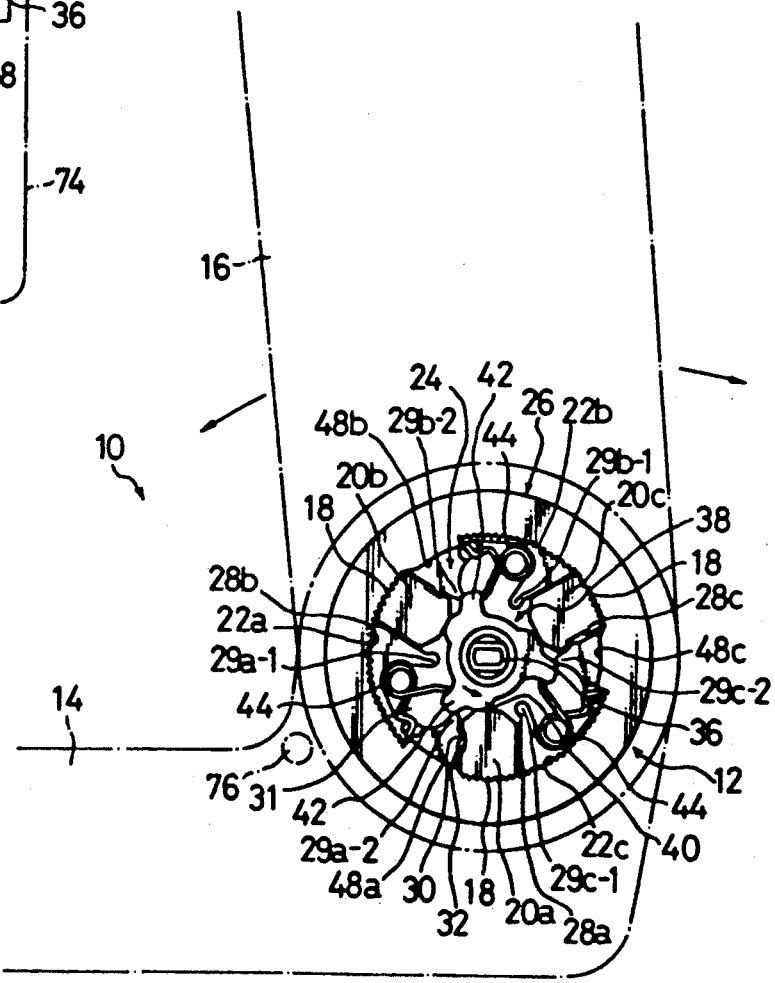
FIG. 6 is an explanatory diagram showing the reclining device to be locked in a first lock position.

With the above-described elements, as understandable from FIGS. 2, 5 and 6, the rotatable plate (26) is slidably fitted and secured with the stationary base plate (27), with the cam (38) sandwiched therebetween. FIG. 6 shows the interconnection among those major elements of the present invention. Namely, as is apparent, the lock gears (20a)(20b)(20c) are so disposed as to be engaged with or disengaged from the inwardly toothed and unlock portions (22a, 22b, 22c)(48a, 48b, 48c) in a radial way, and free ends respectively of the three torsion springs (44) are resiliently, pressingly abutted against each of the three spring securing edges of the cam (38), in order that the cam (38) is thereby so biased as to rotate about the central axis of the shaft (36) in counterclockwise direction as indicated by the arrow. The cam (38) is however limited by its biased rotation due to the fact that the spring securing edges thereof are respectively borne upon the counterclockwise-limiting first, second and third cam rotation limit areas (29a-2)(29b-2)(29c-2). By being so constructed, the three pressure surface (40b) of the cam (38) are normally biased into contact with the locking surfaces (21b) of the lock gears (20a)(20b)(20c), respectively, whereupon in the normal state as in FIG. 6, the first, second and third lock gears (20a)(20b)(20c) are each biased by the pressure edges (40) of the cam (38) in a direction radially away from the center of the shaft (36), to thereby be kept in meshed engagement with the respective first, second and third inwardly toothed portions (22a)(22b)(22c). Under that state, the locking mechanism (12) locks the seat back frame (16) against rotation by virtue of such biased engagement of the lock gears (20a)(20b)(20c) with the mating toothed portions (22a)(22b)(22c).

Designation (74) denotes a cover which covers the base end part of the operation lever (70) to which is connected the shaft (36) for aesthetical improvement purpose.

Now, referring to FIGS. 6, 7 and 8, a description will be made of the operation of the above-constructed reclining device (10).

FIG. 6 shows a first locked state of the seat back (15) with respect to the seat cushion (17) and thus the relative locked positions among the lock gears (20a)(20b)(20c) and inwardly toothed and unlock portions (22a, 22b, 22c)(48a, 48b, 48c). In this initial locked state, it is preferable that the seat back (15) is inclined forwardly at approx. 9 degrees relative to the seat back (17). The illustrated embodiment indicates that the first lock gear (20) is retained in mesh with the part of the first inwardly toothed portion (22a) which continues from and lies in vicinity of the sloped portion (48-2) of the first unlock portion (48a), and likewise, the second and third lock gears (20b)(20c) are respectively retained in mesh with the second and third inwardly toothed portions (22b)(22c) at the part adjacent to the corresponding sloped portions (48-2) thereof. Stated otherwise, the first, second and third lock gears (20a)(20b)(20c) are respectively pressed by the cam (23) under the biasing force of the three torsion springs (44) in a direction extending radially outwards so as to be kept engaged with the first, second and third inwardly toothed portions (22a)(22b)(22c) in a manner adjoining the respective sloped portions (48-2) of the latter.

Under the foregoing first locked condition, when the operation lever (70) is rotated upwardly, causing the cam (32) to rotate in the counterclockwise direction, overcoming the biasing force of the springs (44), the three pressure edges (42) of the cam (32) are rotatively displaced about the central axis of the shaft (36) in a direction away from the respective three lock gears (20a)(20b)(20c) and released from the abutted state upon the respective locking surfaces (21b) of those lock gears. In this respect, more specifically, the pressure edges (42) are smoothly slided along the locking surfaces (21b) and one of the pair of shoulder portions (21c) (21c) associated respectively with the lock gears (20a) (20b) (20c), said one of the two shoulder portions (21c) (21c) facing in the clockwise direction as viewed from FIG. 6. Then, as shown in FIG. 7, the pressure edges (42) are positioned adjacent those shoulder portions (21c) respectively, as the lever (70) is rotated towards the maximum upward level. The lever (70) is then limited to its upward rotation because of the spring securing edges (42) of the cam (38) being respectively borne upon the clockwisely-limiting first, second and third cam rotation limit areas (29a-1) (29b-1) (29c-1).

Hence, the lock gears (20a) (20b) (20c) are released from the locked state and allowed to be freely slidable along the respective guide grooves (28a) (28b) (28c). Then, the second and third lock gears (20b) (20c), of which toothed portions (18) (18) are directed upwardly as opposed to the downwardly directed first lock gear (20a), are naturally slid down under gravity force along the respective grooves (28b) (28c), as can be seen from FIG. 7, and disengaged from the respective inwardly toothed portions (22b) (22c). On the other hand, the first lock gear (20a), due to its own weight, remains meshed on the first inwardly toothed portion (22a), which means that there is no positive engagement between the first lock gear (20a) and first inwardly toothed portion (22a).

It should be noted here that the seat back (15) is normally so biased as to be inclined forwardly by means of a suitable spring means (not shown) and the forward rotation range of the seat back (15) should be limited by a stopper (76) provided at the junction between the seat cushion (14) and seat back (15).

Accordingly, under such forward rotation biasing force of the spring means, the rotatable plate (26) is applied a rotational force in the counterclockwised direction, so greatly as to disengage the first lock gear (20a) quickly from the toothed portion (22a), with the result that the first lock gear (20a) rides over the toothed portions (22a), ascending the sloped portion (48-2) of the first unlock portion (48a), and rides upon the unlock surface (48-3) of the same. In other words, upon operation of lever 70 in FIG. 8 to release the lock gear (20a) (20b) (20c) from firm engagement with the inwardly toothed portions (22a) (22b) (22c), the seat back (16) is returned automatically by the forward biasing force of the suitable spring means up to the initial position in FIG. 6. As the seat back (15) is limited its forward inclination by means of that stopper (76), the toothed portion (18) of the first lock gear (20a) is located upon the first unlock portion (48a), while at the same time, those of other second and third lock gears (20b) (20c) are also located at the respective second and third unlock portions (48b) (48c), as in FIG. 7. Consequently, the seat back (15) is brought to the illustrated forwardly-inclined point, thereby allowing easy entry of a rear occupant therethrough into a rear seat (not shown), and it is to be appreciated that, even at that inclined state, the seat back (15) stands unlocked and ready to be inclined backwardly, by virtue of the three lock gears (20a) (20b) (20c) being slidable upon the smooth unlock surfaces respectively of the unlock portions (48a) (48b) (48c).

Preferably, the forwardly inclination angle range, within which the seat back (15) is rotated forwardly from the first locked position as in FIG. 6 to the most forward inclination limit point defined by the stopper (76), should be set at about 40 degrees which is generally thought to be normal for providing behind the seat back (15) a space sufficient for an occupant to enter into a rear seat. For that reason, the adjoining relative location of the first lock gear (20a) and first unlock portion (48a) as in FIG. 6 should preferably be such that an angle between them assumes about 40 degrees in relation to the central axis of the shaft (36), and the same goes for other pair of adjoining second lock gear (20b) and second unlock portion (48b) as well as for other pair of third lock gear (20c) and third unlock portion (48c), whereby each of the three lock gears (20a) (20b) (20c) is brought upon the respective unlock portions (48a) (48b) (48c) in place, precisely, as in FIG. 7.

Figure 7:
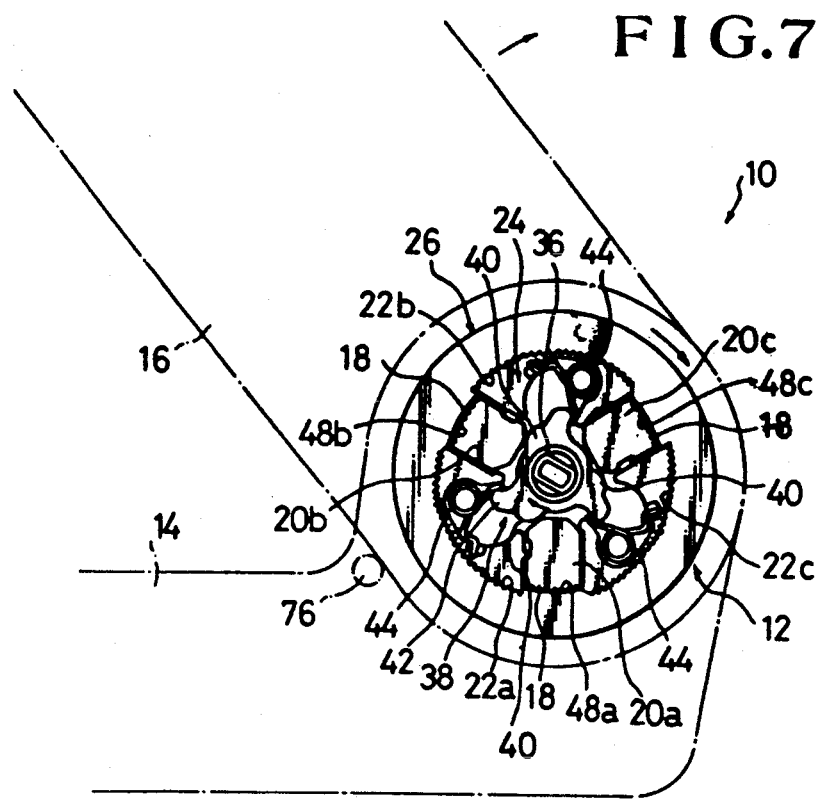
FIG. 7 is a explanatory diagram showing the reclining device to be set in an unlocked state, with a seat back being inclined forwardly.

Accordingly, when it is desired to return the seat back (15) from the most forwardly inclined position in FIG. 7 to the initial standing position in FIG. 6, an occupant has only to push the seat back (15) backwardly, using a proper force overcoming the forwardly biasing force of the abovementioned spring means. Then, the rotatable plate (26) is simultaneously rotated clockwise with such backward rotation of the seat back (15), whereupon, the three unlock portions (48a) (48b) (48c) are rotatively displaced in the same clockwise direction, sliding upon and away from their mating lock gears (20a) (20b) (20c), which thus places the lock gears in a state movable freely vertically along the respective guide grooves (28a) (28b) (20c) at that moment. Consequently, this allows the cam (38) to be biasingly rotated clockwise by the force of the torsion springs (44).

Therefore, the three pressure edges (44) of the cam (38) are respectively moved in contact with and along the shoulder portions (21c) and locking surfaces (21b) of the lock gears (20a) (20b) (20c), pressing the latter into mesh engagement with the respective inwardly toothed portions (22a) (22b) (22c), as shown in FIG. 6. In this way, the seat back (15) is returned to and locked at the initial position by merely pushing the seat back (15) backwardly.

Figure 8:
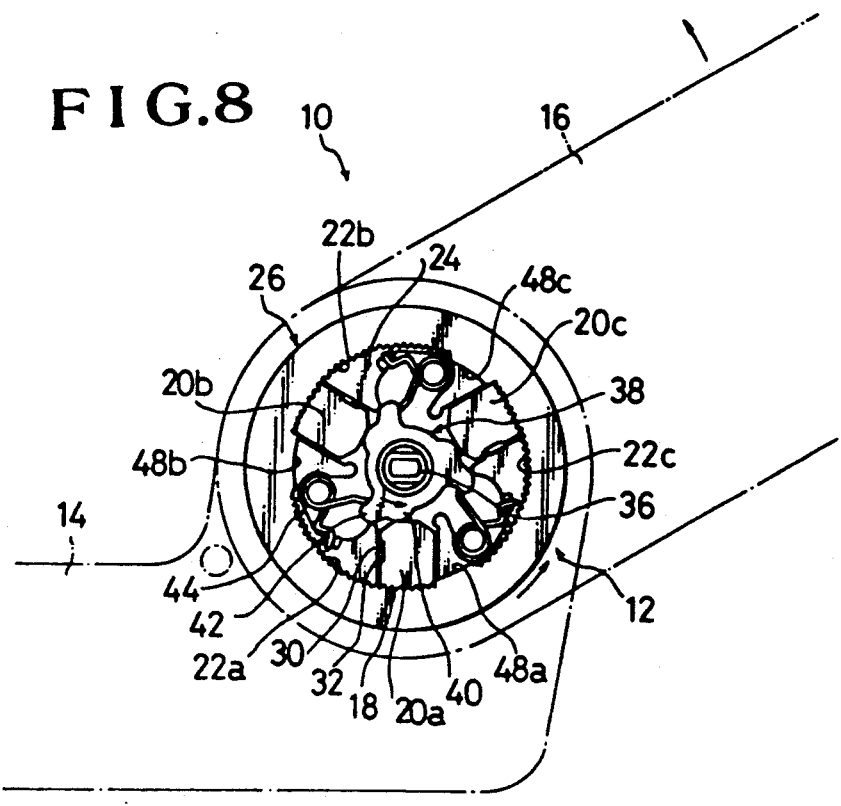
FIG. 8 is an explanatory diagram showing the reclining device to be locked in a most rearwardly lock position, with the seat back being inclined at a most rearward point.

Referring to FIGS. 6 and 8, when it is desired to make a reclining adjustment of the seat back (15), that is, a rearwardly inclination adjustment of the same, an occupant on the seat (A) rotates the operation lever (70) upwardly to cause the clockwise rotation of the cam (38) so as to release the first locked state of the locking mechanism (12), as stated above, and at the same time gives his or her weight at the back against the seat back (15). If the occupant wishes to have the seat back (15) inclined to the most rearwardly inclined point as in FIG. 8, he or she has to keep raising the lever (70) while pushing the seat back (15) with his or her weight rearwardly. Then, while the first lock gear (20a) is lightly engaged upon the first toothed portion (22a) with its weight, the second and third lock gears (20b) (20c) are disengaged from the respective second and third toothed portions (22b) (22c) under gravity. The rearward force given by the occupant at the seat back (15) is sufficient to cause the first lock gear (20a) to ride over the series of teeth of the first toothed portion (22a) because the first lock gear (20a) per se weighs far less than that rearward force and is therefore knocked or thrusted upwardly by the teeth of the first toothed portion (22a) being streamed clockwise against the vertically movable teeth of the lock gear (20a). Thus, the rotatable plate (26) is permitted to be rotated clockwise further by rearward inclination of the seat back (15). Of course, during this rotation, the lever (70) should be held upwardly to keep the pressure edges (40) of the cam (38) out of abutment with the respective lock gears (20a) (20b) (20c). Then, in the course of the clockwise rotation of the rotatable plate (26), the vertical stopper surface (48-1) of the third unlock portion is displaced towards and collides against the lower part of the right side of the first lock gear (20a), at which time, the stopper surface (48-1) functions as a stopper in cooperation with the first lock gear (20a) against the clockwise rotation of the rotatable plate (26) relative to the stationary base plate (24), whereupon, the seat back (15) is prevented its further rearward rotation and given its most rearward inclination limit. As such rotation limit is sensed, the occupant has to release the lever (70) out of his or her hand so that the cam (38) is biasingly rotated by the springs (44) to press all the three lock gears (20a) (20b) (20c) into mesh with the respective inwardly toothed portions (22a) (22b) (22c) at the regions adjacent the respective vertical stopper surfaces (48-1) of the three unlock portions (48a) (48b) (48c), as shown in FIG. 8. Preferably, the most rearward inclination angle of the seat back (15) relative to the seat cushion (17) is approx. 65 degrees from the aforementioned first locked position, and for that purpose, each of the first, second and third inwardly toothed portions (22a) (22b) (22c) should preferably be formed at a proper arc length such that approx. 65-degree angle is defined between the central line each of the three lock gears (20a) (20b) (20c) and the stopper each of the three unlock portions (22a) (22b) (22c).

Of course, it is to be understood that the seat back (15) can be adjusted in its rearward inclination angle between the first locked position and most rearward inclination position, by releasing the lever (70) at a desired point so as to permit the lock gears (20a) (20b) (20c) to engage the selected points in the respective inwardly toothed portions (22a) (22b) (22c).

From the descriptions above, it is appreciated that (i) all the principal members of the locking mechanism (12) are arranged within the stationary base plate (24) and rotatable plate (26), without need to equip a separate unit of locking means with the reclining device (10), and further the number of those members is quite small as compared with the conventional reclining device; that is to say, only lock gears, cam, torsion spring, shaft, as well as the base plate and rotatable plate, are at least required, which avoids a large dimension of reclining device, (ii) simply rotating upwards the lever (7) permits the automatic forward inclination of the seat back (15) relative to the seat cushion (17) so as to facilitate the ease of quick entry of a rear seat occupant into a rear seat, which also eliminates the need to provide a separate forward inclination mechanism to the reclining device, (iii) the locking mechanism (12) is of a play-free structure in which the three radially arranged lock gears (20a) (20b) (20c) are to be meshed with the respective three inwardly toothed portions (22a) (22b) (22c) in a tight manner, so that there is eliminated the foregoing prior art problem that the seat back is moved variably due to a play among the constituent elements, making an occupant uneasy therewith psychologically, and (iv) the forward inclination of the seat back (15) for rear-seat occupant entry purpose can be effected only by the biasing means inherently used in the reclining device (10), without any other separate biasing means having a great biasing force which has been used in the conventional reclining device, and therefore, a front-seat occupant may unlock and adjust the reclining device without being strongly pressed at his or her back.

While the above description has been made, it should be understood that the present invention is not limited to the illustrated embodiment, but any other modification, replacement and addition may structurally be possible. For example, the stationary base plate (24) and rotatable plate (26) may be disposed at the seat back frame (16) and seat cushion frame (14), respectively. The locking mechanism (12) may be provided between the seat cushion and seat back frames (14) (16) via a base bracket and rotatable arm.

What is claimed is:

1. A reclining device for a seat in which the seat includes a seat cushion and a seat back rotatably connected with said seat cushion, said seat cushion and back, respectively, having a seat cushion frame and a seat back frame provided therein, said reclining device comprising:
    a locking mechanism including:
    a stationary base plate fixed on said seat cushion;
    a movable plate which is rotatably secured on said seat back frame;
    an inwardly toothed portion formed in said movable plate, said inwardly toothed portion being defined in a circular manner; and
    at least one lock gear secured in said stationary base plate in a slidable manner such as to be mesh engageable with said inwardly toothed portion; and
    unlocking means which is defined in said inwardly toothed portion in a manner projecting therefrom inwardly, wherein each said unlocking means comprises at least one unlocking projection and each unlocking projection includes an even surface, a vertical stopper surface and a sloped surface for causing said lock gear to ride upon said even surface and is so formed that said sloped surface and said vertical stopper surface are disposed respectively at both sides of said projection, with said even surface being defined between said vertical stopper and sloped surfaces.

2. The reclining device according to claim 1, wherein said unlocking means comprises a projection formed partially in said inwardly toothed portion, said projection having an even surface on which said lock gear rides.

3. The reclining device according to claim 1, wherein said stationary base plate is provided on said seat cushion frame and said rotatable plate is provided on said seat back frame.

4. The reclining device according to claim 1, wherein said stationary base plate and rotatable plate are each provided with an integral bolt, wherein said bolt of said stationary base plate is fixedly secured via a nut to one of said seat cushion and seat back frames and said bolt of said rotatable plate is fixedly secure via a nut to the other of said seat cushion and seat frames, and wherein said locking mechanism is interposed between said seat cushion frame and said seat back frame.

5. The reclining device according to claim 1, wherein three lock gears are provided and at least one lock block is formed at its one surface with a toothed portion, wherein said three block gears are arranged in an inner surface of said stationary base plate such that they are disposed radially relative to a center of said base plate in an equally spaced-apart relation with one another, and are further slidably secured in said base plate, wherein said inwardly toothed portion is formed in an inner surface of said rotatable plate, wherein said block gears are slidable towards and away from said inwardly toothed portion, wherein a cam is rotatably provided between said base plate and rotatable plate, so that said three block gears are to be so contacted by the cam as to be brought into mesh engagement with said inwardly toothed portion, and wherein said cam is connected to an operation lever.

6. The reclining device according to claim 5, wherein said stationary base plate is of a disc shape having, three guide grooves formed in its inner surface such that they are disposed in a 120-degree spaced-apart relation with one another, wherein said three lock gears are slidably received in said three guide grooves, respectively, wherein said three guide grooves are each formed with a protrusion at one side whereas said three lock gears are each formed with a cut-away portion at one lateral side corresponding to said one side of each of said three guide grooves, whereby said three lock gears are limited in their upward and downward movements along the respective guide grooves by virtue of said cut-away portions of said lock gears being slidably abutted against said protrusions of said guide grooves.

7. The reclining device according to claim 5, wherein said cam is fixed on a shaft which passes rotatably through central holes of said stationary base plate and rotatable plate, and is provided integrally with a pressure means for pressing said three lock gears in a radially outward direction from said center of said stationary base plate, wherein said cam is further provided with a spring securing means, and wherein a torsion spring is interposed between said spring securing means and said base plate, whereby said cam is biasingly rotated by said torsion spring to cause said pressure means to press said three lock gears into mesh engagement with said inwardly toothed portion of said base plate.

8. The reclining device according to claim 5, wherein rotation of said operation lever causes said cam to rotate in a direction to press said lock gears against and release said lock gears from said inwardly toothed portion.

9. The reclining device according to claim 1, wherein said unlocking means comprises three unlocking projections, the arrangement of said three projections being such that they are formed at said inwardly toothed portion in an equally spaced-apart relation with one another.

10. The reclining device according to claim 1, wherein a rim is formed on said base plate and said rotatable plate is slidably fitted in said rim.

* * * * *